United States Patent

[11] 3,561,308

| [72] | Inventor | Stanley V. Ehrlich<br>Portland, Oreg. |
|---|---|---|
| [21] | Appl. No. | 749,514 |
| [22] | Filed | Aug. 1, 1968 |
| [45] | Patented | Feb. 9, 1971 |
| [73] | Assignee | Western Manufacturing, Inc.<br>Portland, Oreg.<br>a corporation of Oregon |

[54] COMMINUTOR
15 Claims, 6 Drawing Figs.

[52] U.S. Cl. ................................................ 83/214,
83/215, 83/237, 83/257, 83/282, 83/519, 83/564,
83/906
[51] Int. Cl. ................................................ B26d 5/20
[50] Field of Search ........................................ 83/215,
237, 906, 213, 214, 220, 257, 282, 564, 216, 217,
519, 632, 618

[56] References Cited
UNITED STATES PATENTS

| 1,816,806 | /1931 | Gangloff et al. | 83/237X |
| 2,655,213 | /1953 | Anderson | 83/906X |
| 2,798,550 | /1957 | Kubodera | 83/237X |
| 2,936,663 | /1960 | Gautron | 83/214X |
| 3,410,161 | 11/1968 | Roch | 83/282X |
| 1,312,986 | /1919 | Hoffmann | 83/632X |

*Primary Examiner*—Andrew R. Juhasz
*Assistant Examiner*—James F. Coan
*Attorney*—Buckhorn, Blore, Klarquist and Sparkman

ABSTRACT: A comminutor for reducing scrap materials and particularly rubber tires to particulate form. A series of aligned reciprocating knives driven sequentially coact in shearing relationship with an anvil to nibble material advanced at intervals onto the anvil by a conveyor. Mechanism is provided to shift the pivotal axes of the knives periodically so as to withdraw the knives from the anvil as they continue to reciprocate and to advance and side-shift the conveyor when the knives are withdrawn so that particles are severed from the material during each cutting cycle.

PATENTED FEB 9 1971

STANLEY V. EHRLICH
INVENTOR

BY

BUCKHORN, BLORE, KLARQUIST & SPARKMAN
ATTORNEYS

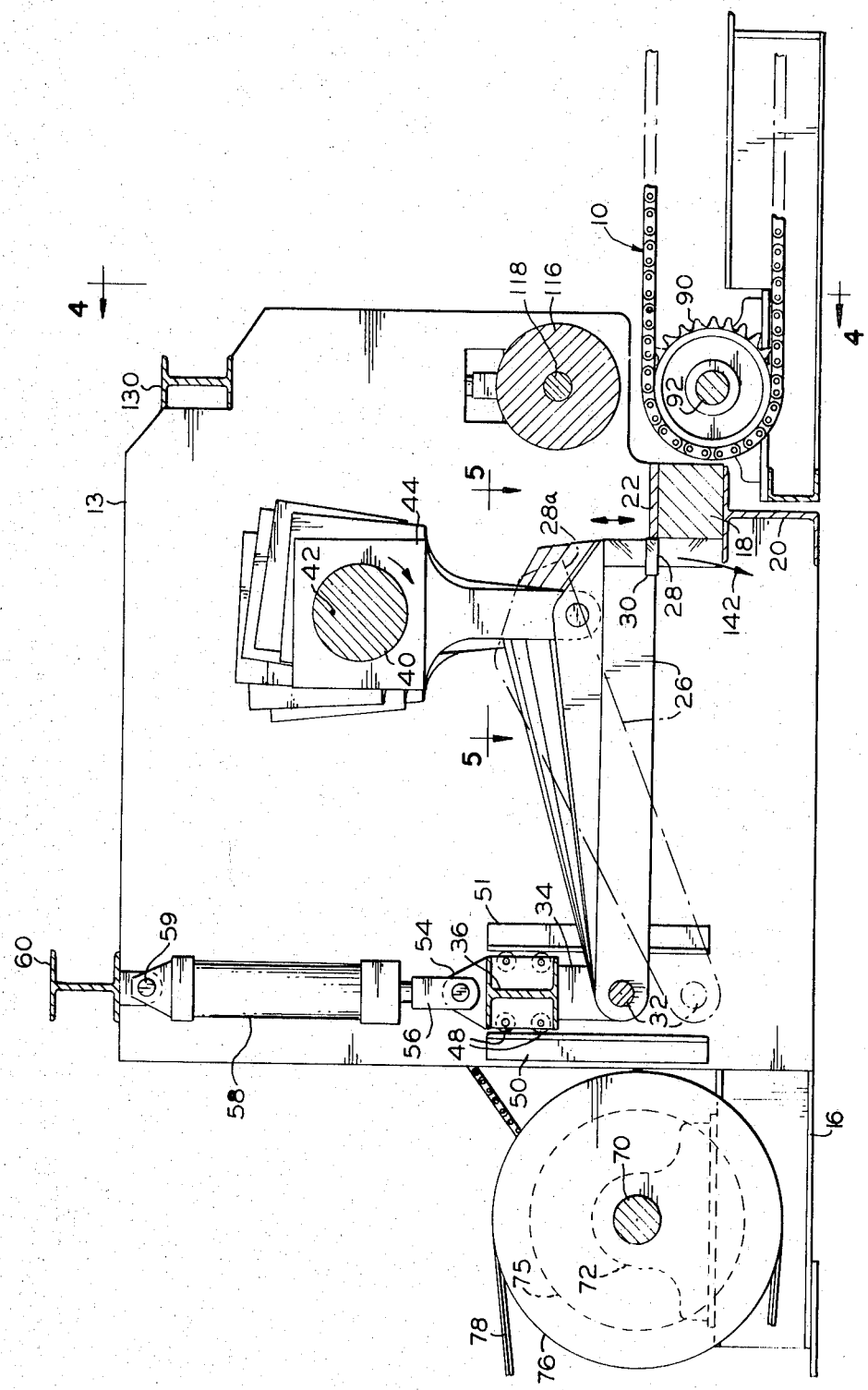

STANLEY V. EHRLICH
INVENTOR

BY
BUCKHORN, BLORE, KLARQUIST & SPARKMAN
ATTORNEYS

COMMINUTOR

BACKGROUND OF THE INVENTION

1. Field of the Invention

The present invention relates to a comminutor for reducing relatively large sheet or bulk material to smaller particulate form.

2. DESCRIPTION OF THE PRIOR ART

Conventional wood chippers have rotary knives which coact with stationary cutting edges to cut up fibrous materials fed into the path of the moving blades. In contrast, hammermill-type comminutors commonly rely on impact between moving hammers and stationary anvils to crush or pulverize certain types of material. However, neither hammermills nor wood chippers are suitable for comminuting rubber tires because of the tough and elastic properties of such tires. Thus there is a need for apparatus capable of reducing rubber tires and other general scrap materials to particulate form to reduce their bulk for shipment, and to facilitate disposal or reutilization as desired.

SUMMARY OF THE INVENTION

The present invention fulfills the foregoing need in providing a comminutor especially suited for reducing tires of rubber, fabric and wire composition and other bulk scrap such as scrap wire and other semiresilient and resilient materials to particulate form. The apparatus of the invention employs a series of laterally aligned, pivoted and sequentially operating knives driven from a common crankshaft to shear at very high speeds material advanced across an anvil at intervals between cutting cycles of the knives. A unique conveyor feed mechanism includes a means for side-shifting the material on the anvil during each advance of the material so that the knives sever complete segments from the material during each cutting cycle. The knives may be reciprocated at extremely high speeds while still providing time for advancing and side-shifting the material on the anvil through the provision of a unique means for withdrawing the knives from the cutting edge of the anvil at intervals by shifting the pivot axes of the knives.

Primary objects of the present invention are to provide:
1. a comminutor capable of reducing rubber tires and other bulk rubber, wire and miscellaneous materials to particulate form;
2. a comminutor as afore said which is extremely fast-acting;
3. an apparatus as aforesaid which provides a high shearing torque capable of severing many different tough and resilient materials into particles;
4. an apparatus as aforesaid including a plurality of reciprocating knives;
5. an apparatus as aforesaid including drive means for reciprocating the knives in rapid sequence;
6. an apparatus as aforesaid including means for advancing material into a cutting position while the knives continue their reciprocating movement;
7. An apparatus as aforesaid including means for severing a plurality of particles during each cutting cycle of the knives; and
8. An apparatus as aforesaid which is simple and economical to construct, operate and maintain.

BRIEF DESCRIPTION OF THE DRAWINGS

The foregoing and other objects and advantages of the present invention will become more apparent from the following detailed description which proceeds with reference to the accompanying drawings wherein;

FIG. 3 is a vertical sectional view taken approximately along 3–3 of FIG. 1 on a scale enlarged from that of FIG. 2;

DETAILED DESCRIPTION

Figure 1:
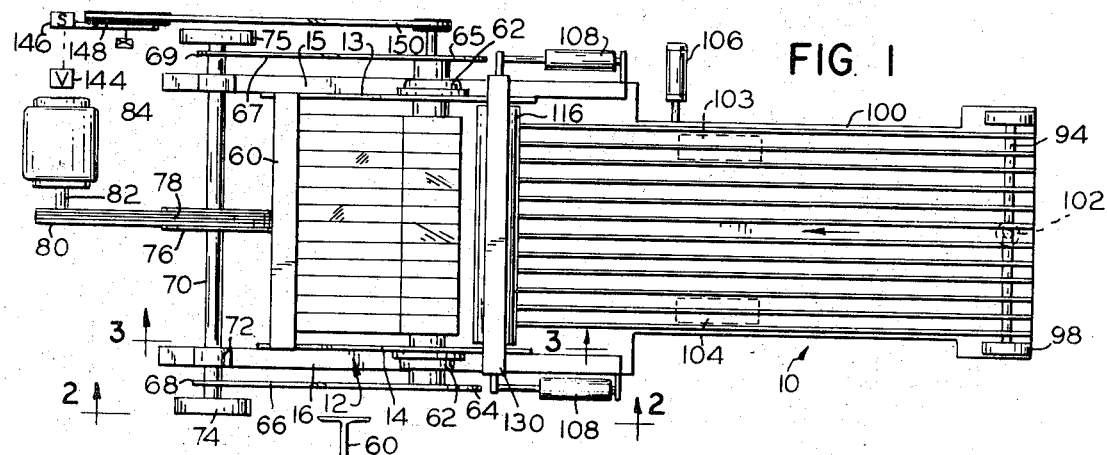
FIG. 1 is a plan view of a comminutor in accordance with the present invention.

With reference to the drawings, FIG. 1 discloses a comminutor which includes a feed means comprising a plurality of endless conveyor chains 10 which convey material to be cut to a main cutting chamber 12 defined by opposite upright housing sidewalls 13, 14 supported by longitudinally extending base frame members 15, 16.

Referring particularly to the interior of the cutting chamber as shown in FIG. 3, an anvil block 18 extends across the chamber adjacent the offbear end of conveyor chains 10 and is supported by a cross-frame member 20. Anvil 18 includes a hardened and replaceable top face place portion 22 at approximately the same level as the upper flights of conveyor chains 10. The anvil including its faceplate has a serrated cutting edge portion 24 of generally sawtooth configuration as shown best in FIG. 5.

Knife means comprising a series of laterally aligned, elongated knife members 26 include pointed forward cutting edge portions 28 shaped to cooperate in shearing relation to the serrated anvil cutting edge 24. The knives are positioned in side-by-side relationship so that their cutting edges 28 interfit with each of the indentations formed by the serrated cutting edge 24 of the anvil to produce a continuous serrated cut in material placed over the cutting edge of the anvil. Knife cutting edges 28 are preferably provided on a hardened cutting insert 30 at the lower front end of each knife.

Each knife is pivoted at its rear end to a pivot pin 32 which in turn is suspended by a hanger member 34 from a common I-beam support member 36. The pivot pins 32 of the various knives are axially aligned with one another to provide axial alignment of their respective pivot axes.

The several knife members are reciprocated in predetermined sequence vertically into cutting relation to the anvil by a reciprocating means which includes a crankshaft 38 having a series of eccentric portions 40 offset from the rotational axis 42 of the crankshaft. The eccentric portions correspond in number to the number of knife members, and are connected thereto by connecting rods 44. The connecting rods translate rotary motion of the crankshaft to a vertically reciprocating motion of the knife members through their pivotal connections to each.

Figure 4:
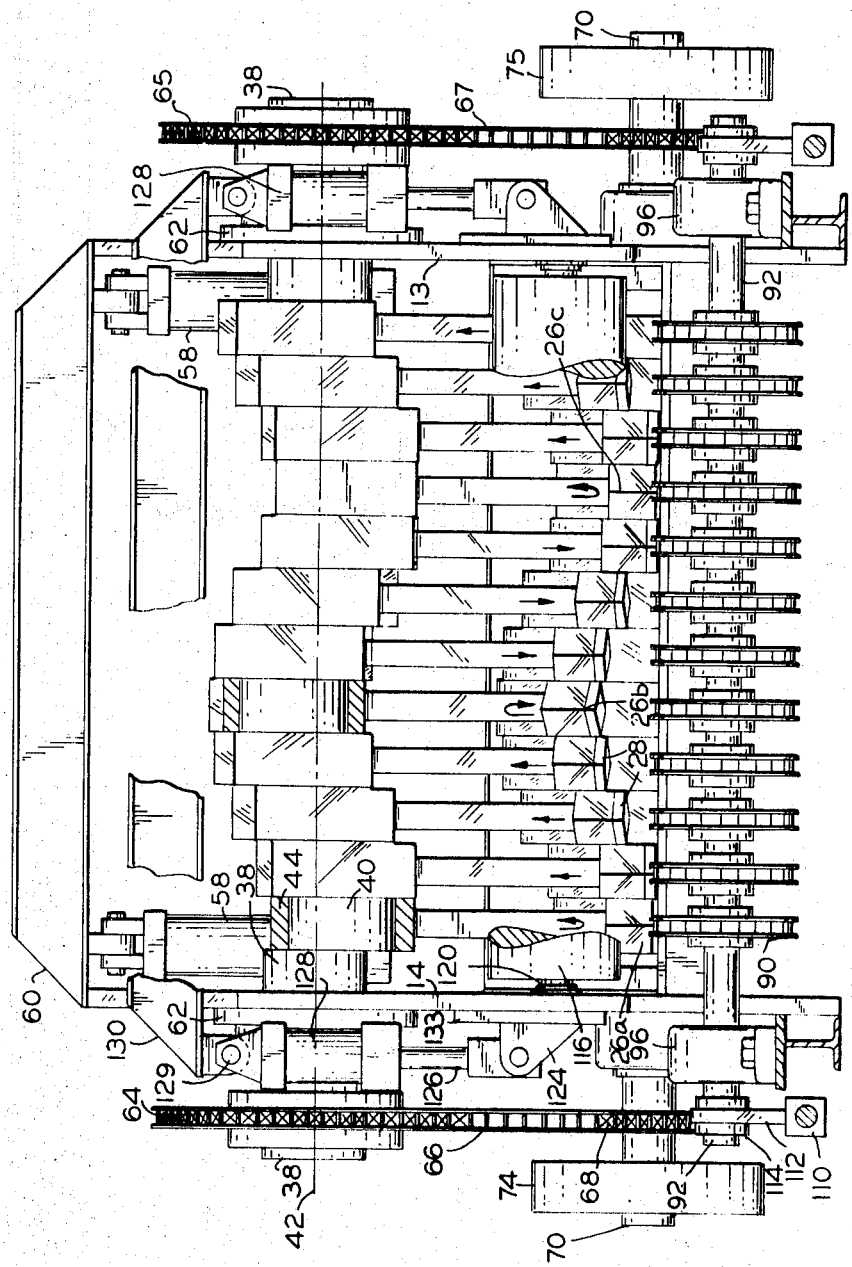
FIG. 4 is a vertical sectional view on approximately the same scale as FIG. 3, taken along the line 4–4 of FIG. 3.

The eccentric portions of the crankshaft are arranged with respect to the rotational axis of the crankshaft to operate the knives in sequence. In the illustrated apparatus as shown in FIG. 4, the eccentric portions are arranged so that when the extreme left-hand knife 18a is at the bottom of its cutting stroke as shown, each succeeding knife proceeding across the machine is in a slightly different part of its cutting stroke, proceeding through the first eight of the 12 knives. Thus when first knife 18 a is at the bottom of its cutting stroke, the fifth knife 18b is at the top of its cutting stroke, and the ninth knife 18 c is in the same relative position as knife 18a, at the bottom of its cutting stroke, and so on. With the 12-knife machine shown, the axes of the eccentric portions are spaced uniformly 22½ degrees from one another about the circumference of the imaginary circle described by such axes relative to the crankshaft axis 42, as the crankshaft rotates. This spacing provides a uniform time interval between successive cuts made by each successive knife proceeding in a direction from the left-hand end of the machine of FIG. 4 to distribute the loading on the crankshaft and inhibit machine vibration.

Crankshaft 38 is mounted in suitable bearings 62 (FIG. 1) carried by the opposite sidewalls 13, 14 of the housing. Drive means for rotating the crankshaft include a pair of sprockets 64, 65 carried by the opposite ends of the crankshaft and connected by endless chains 66, 67 to drive sprockets 68, 69 on a primary driven shaft 70. Shaft 70 is supported in bearings 72 carried by base frame members 15, 16 and its opposite ends support flywheels 74, 75. A large pulley 76 at the center of shaft 70 is connected by an endless belt 78 to a drive pulley 80 carried by the drive shaft 82 of a drive motor 84, shown in FIG. 1.

The knife mounting means includes means for shifting the pivot pins 32 of the knives downwardly to withdraw the knife cutting edges from cutting relationship with the anvil cutting edges and thereby permit the periodic advance of material onto the anvil by conveyor chains 10. This shifting means includes rollers 48 carried by pivot pin support beams 36 engaging a pair of vertically extending guideway members 50, 51, which permit a vertical shifting of pivot pins 32. Support beams 36 includes a bracket 54 to which is pivoted connecting rods 56 of vertical fluid power cylinders 58. The cylinders in turn are suspended by pivot pins 59 to an overhead cross-frame member 60. By extending and retracting cylinders 58, knife pivot pins 32 are shifted vertically from their normal position as shown in solid lines in FIG. 3 to a lowered position as shown in phantom lines. Shifting of the pivot pins to their lowered positions effectually withdraws cutting edges 28 of the knife members to the retracted position 28a as shown in FIG. 3 when at the lower limits of their strokes. Means other than the fluid cylinders 58 could be provided for shifting the pivot pins 32. For example, a crankshaft and connecting rod arrangement could be driven by the same motor that drives main crankshaft 38 but timed to reciprocate the pivot pins only once for every several reciprocations of the knife members. This would permit the knife members to be reciprocated at an extremely rapid rate, and yet permit a sufficient time for advancing new material to be cut across the anvil.

Figure 2:
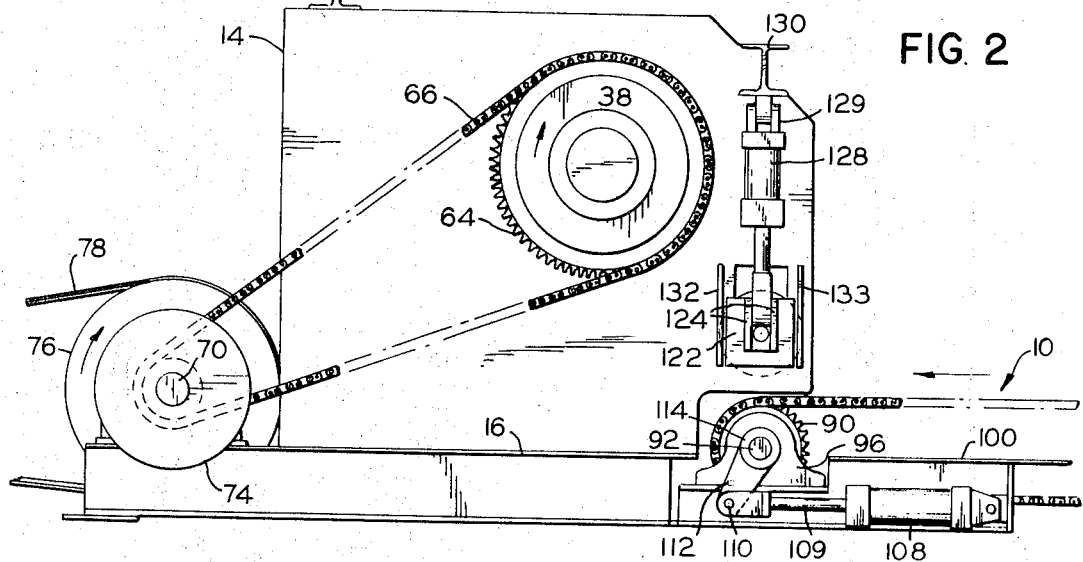
FIG. 2 is an enlarged side elevational view of the main body portion of the comminutor of FIG. 1 as viewed along the line 2–2 of FIG. 1.

Material feed chains 10 are trained about sprockets at their opposite ends, the forward ones 90 of which are shown in FIGS. 2, 3 and 4. The sprockets are carried on a forward conveyor shaft 92 and a rear conveyor shaft 94 with front shaft 92 being mounted in bearings 96 (FIG. 2) and rear shaft being mounted in bearings 98 (FIG. 1). The bearings for the conveyor shafts are supported on a conveyor frame 100, the rear end of which is pivoted at 102 and the forward end of which is supported on longitudinally extending rollers 103, 104 shown schematically in FIG. 1 so that the forward end of the frame and thus the forward end of the conveyor is capable of a sidewise shifting movement for a purpose to be described. A fluid power cylinder 106 is provided to supply the required sidewise shifting movement of the forward end of the conveyor.

The conveyor chains are advanced at intervals by a drive means which includes, with reference to FIG. 2, a fluid power cylinder 108 having a piston rod 109 connected by a clevis 110 to the outer end of a crank arm 112. Crank arm 112 forms part of a one-way clutch 114 on conveyor shaft 92. The clutch positively engages shaft 92 to rotate the shaft in a counterclockwise direction as viewed in FIG. 2 when cylinder 108 is retracted from its extended position shown, but slips over the shaft when the piston rod 109 is extended. Thus the successive extensions and retractions of cylinder 108 effect an intermittent advancing of the conveyor chain. The right-hand end of conveyor shaft 92, as viewed in FIG. 4, is provided with a drive means identical to that just described with respect to the left-hand end of the same shaft, including a second fluid-powered cylinder corresponding to cylinder 108 which is operated in unison with cylinder 108.

The illustrated apparatus also includes a pressure holddown means for compressing material such as rubber tires fed by the conveyor chains to the anvil during the cutting of the material. The purpose of such means is to prevent any substantial movement of the material while it is cut and to compress it to a thickness small enough to be inserted between the knife cutting edges and the anvil cutting edges. Such means includes a holddown roll 116, shown in FIG. 3, which is mounted on a laterally extending shaft 118 rotatably mounted in bearings 120 at its opposite ends. The bearings in turn are carried by rectangular plates 122 which are slidably mounted on the outer faces of housing sidewalls 13, 14. Each plate 122 includes ears 124 connected to piston rod 126 of a fluid power cylinder 128 suspended at 129 from an overhead cross-frame member 130. There are identical holddown cylinders 128 and appurtenant connections at the opposite sides of the frame, as will be apparent from FIG. 4. Rectangular bearing plates 122 are adapted to slide vertically over the outer faces of opposite sidewalls 13, 14 between a pair of guide bars 132, 133 on such sidewalls upon extension and retraction of holddown cylinders 128.

The operation of pivot-shifting cylinders 58, holddown cylinders 128, conveyor advancing cylinders 108, and conveyor side-shifting cylinder 106 are synchronized as follows: Each time pivot-shifting cylinder 58 lowers pivot pins 32 to withdraw the knife members 26 from the cutting edge of anvil 18, conveyor advance cylinders 108 are retracted to advance the upper flight of conveyor chains 10 and thereby advance material onto the anvil. While the knife members are retracted, holddown cylinders 128 retract to raise holddown roll 116 thereby permitting advance of material onto the anvil. Also while the knives are retracted, side-shift cylinder 106 either extends or retracts, depending on its initial position, to shift the forward, or off-bear end of conveyor 10 sideways through a predetermined distance equal to approximately one-half the width of a single serration cut by the knives. Then as the knives are returned to their cutting positions by raising their pivot axes conveyor advance cylinders 108 are returned to their extended positions in readiness for the next withdrawal of the knives, and holddown cylinders are again extended to press holddown roll 116 against the material to be cut. The synchronizing means for correlating the actions of the various cylinders include a master hydraulic valve means 144 shown in FIG. 1, the positioning of which may be controlled electrically by a timing switch 146. Timing switch 146 may be actuated by a switch cam 148 driven by a timing belt and pulley arrangement 150 from crankshaft 38 as shown schematically in FIG. 1. The speed ratio between the crankshaft and the timing cam is preferably selected so that master valve 131 would actuate the cylinders once for each several revolutions of the crankshaft.

Figure 6:
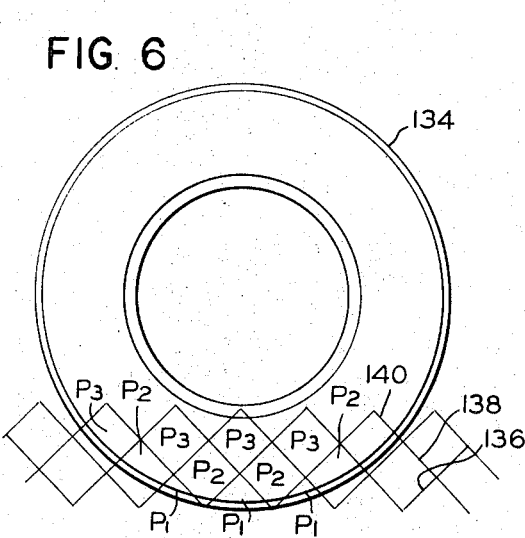
FIG. 6 is a diagram representing in plan a tire and the pattern of cuts in the tire resulting from three successive cutting cycles of the illustrated apparatus.
Figure 5:
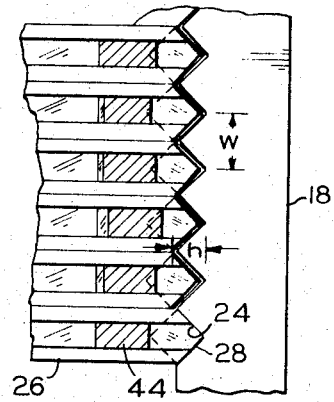
FIG. 5 is a horizontal sectional view on approximately the same scale as FIG. 3, taken along the line 5–5 of FIG. 3.

The purpose of the side-shifting cylinder 106 will be understood from the diagram of FIG. 6 in which the numeral 134 designates a tire to be comminuted. Assuming first that a leading edge 135 of the tire overlies serrated anvil cutting edge 24, the first complete cut made by a complete cutting cycle of the knives will produce a single continuous cut 136 of a serrated configuration, but will actually sever a relatively few particles P1 from the tire itself. Thereafter conveyor advance cylinder 108 advances the tire a distance equal to the height $h$ of a single serration as indicated in FIG. 5. At the same time side-shift cylinder 106 shifts the forward end of the conveyor a distance equal to approximately one-half the total width $w$ of a single serration of the anvil cutting edge. Then during the second cutting cycle of the knife members, a second continuous serrated cut 138 is produced which intersects the first cut 136 to sever from the tire diamond-shaped particles P2. Upon the next succeeding withdrawal of the knives, side-shift cylinder 106 returns the forward end of the conveyor to its initial position and advancing cylinders 108 again advance the tire a distance equal to the height of one serration. Thus the third serrated cut 140 formed by the knives joins the second cut 138 to remove another row of diamond-shaped particles P3 from the tire. Succeeding cuts remove further diamond-shaped particles until the entire tire has been consumed and reduced to particulate form.

Referring to FIG. 3, particles severed by the knife members pass downwardly in the direction of arrow 142 through the bottom of the machine.

I claim:

1. Comminuting apparatus comprising:
   knife means including a plurality of side-by-side knife members having knife cutting edges arranged relative to one another in a manner so as form a continuous cut in a workpiece,
   anvil means including an anvil cutting edge positioned and shaped for cooperative shearing action with said knife cutting edges,
   knife-mounting means mounting said knife members for reciprocating movement,
   knife reciprocating means including a common crank member with eccentric portions and connecting rod means extending from said eccentric portions to each of said knife members,
   said eccentric portions being arranged in a manner so that upon rotation of said crank member, said knife cutting edges are reciprocated sequentially into cutting cooperation with said anvil cutting edge to nibble material advanced onto said anvil means into small discrete particles.

2. Apparatus according to claim 1 including infeed means for feeding material to be cut onto said anvil means and over said anvil cutting edge, and synchronizing means for activating said infeed means to advance material onto said anvil when said knife cutting edges are out of cutting relationship with said anvil cutting edge.

3. Apparatus according to claim 1 including pressure applying means engageable with material to be cut for compressing and holding said material stationary on said anvil means during the cutting action of said knife means.

4. Apparatus according to claim 2 including pressure applying means for compressing and holding said material applying means for compressing and holding said material during the cutting action of said knife means, said synchronizing means being operable to relieve the applied pressure of said applying means during an advance of said feed means and between cuts of said knife means.

5. Apparatus according to claim 1 wherein each said knife member includes an elongated knife body having said knife cutting edge at one end thereof and being pivoted at a pivot point rearwardly of said knife cutting edge to permit said reciprocating movement about said pivot point.

6. Apparatus according to claim 5 including means for periodically shifting all said pivot points simultaneously in a direction to retract all said knife cutting edges from a cutting relationship with said anvil cutting edge upon continued reciprocation of said knife means.

7. Comminuting apparatus comprising:
   knife means including a knife cutting edge;
   anvil means including an anvil cutting edge;
   said knife means and said anvil means being positioned relative to one another for cooperatvie shearing action of their respective cutting edges;
   reciprocating means for reciprocating said knife means including said knife cutting edge into and out of cutting relationship with said anvil cutting edge;
   infeed means for feeding material to be cut onto said anvil means and over said anvil cutting edge;
   synchronizing means for activating said infeed means to advance material onto said anvil when said knife cutting edge is out of cutting relationship with said edge; cutting edge.
   knife mounting means pivotally mounting said knife means for pivotal reciprocating movement with respect to a pivot point rearwardly of said knife edge;
   said knife mounting means including shifting means for shifting said pivot point in a direction to withdraw said knife cutting edge from said anvil cutting edge upon continued reciprocation of said knife means; and
   said synchronizing means being operable to advance said feed means during the time that said shifting means has withdrawn said knife cutting edge.

8. Comminuting apparatus comprising:
   knife means including a knife cutting edge;
   anvil means including an anvil cutting edge;
   said knife means and said anvil means being positioned relative to one another for cooperative shearing action of their respective cutting edges;
   reciprocating means for reciprocating said knife means including said knife cutting edge into and out of cutting relationship with said anvil cutting edge;
   said knife means including a plurality of knife members positioned in side-by-side relationship for cutting coaction with said anvil means, order; and
   reciprocating means being operable to move said knife members into cutting cooperation with said anvil means in predetermined sequential order,
   and means mounting said knife members for pivotal reciprocative movement about axially aligned pivot axes.

9 Apparatus according to claim 8 wherein said mounting means includes shifting means for shifting concurrently the pivot axes of said knife members in a direction to withdraw said knife cutting edges from said anvil cutting edges to permit the advance of material to be cut on said anvil means.

10 Apparatus according to claim 8 wherein the knife cutting edges of said knife members are positioned next adjacent one another to provide upon sequential operation of said knife members a single continuous cut.

11 Apparatus according to claim 8 wherein said reciprocating means comprises a crankshaft operably connected to a source of power, sad said crankshaft including eccentric portions offset in different directions from the rotational axis of said crankshaft, and a plurality of connecting rods pivoted to said eccentric portions and to said knife members.

12. Apparatus according to claim 1 including feed means for advancing material to be cut onto said anvil at intervals between cuts, said knife and anvil cutting edges being shaped to form a regular but periodically undulating cut in said material during each reciprocation of said knife means, and means to side-shift said material on said anvil means through a distance of approximately one-half of one undulation of a cut between cuts and upon an advance of said material so that completion of a cutting cycle reduces the material cut to a plurality of small segments.

13. Comminuting apparatus comprising:
   knife means including a plurality of side-by-side knife members including knife cutting edges;
   anvil means including an anvil cutting edge positioned and shaped for cooperative shearing action with said knife cutting edges;
   knife mounting means mounting said knife members for pivotal movement about axially aligned pivot axes spaced from said knife cutting edges;
   knife reciprocating means including a crank member with eccentric portions and connecting rods extending from said eccentric portions to said knife members for reciprocating said knife members in cutting cooperation with said anvil means about said pivot axes;
   shifting means for shifting the pivot axes of said knife members in a direction to withdraw said knife members out of cutting relation to said anvil means;
   feed means including conveyor means and advancing means for advancing material to be cut onto said anvil at intervals; and
   holding means for holding stationary the material to be cut during the cutting strokes of said knife members. means;

14. Apparatus according to claim 13 wherein said knife cutting edges are shaped and positioned to make a continuous periodically undulating cut in material on said anvil means during a cutting cycle of said knife members, a said advancing means advances material a distance approximating the overall height of an undulation of said cut, and said feed means includes means to side-shift said conveyor means a distance approximating one-half the width of one undulation of said cut, 15. Apparatus according to claim 14 including timing means for retracting said holding means, advancing said conveyor means, and side-shifting said conveyor means during each withdrawal of said knife means.